(12) United States Patent
Suvanen

(10) Patent No.: US 6,230,120 B1
(45) Date of Patent: May 8, 2001

(54) DETECTION OF SPEECH CHANNEL BACK-LOOPING

(75) Inventor: Jyri Suvanen, Helsinki (FI)

(73) Assignee: Nokia Communications Oy, Espoo (FI)

(*) Notice: Subject to any disclaimer, the term of this patent is extended or adjusted under 35 U.S.C. 154(b) by 0 days.

(21) Appl. No.: 09/117,574

(22) PCT Filed: Dec. 4, 1997

(86) PCT No.: PCT/FI97/00759

§ 371 Date: Mar. 12, 1999

§ 102(e) Date: Mar. 12, 1999

(87) PCT Pub. No.: WO98/28936

PCT Pub. Date: Jul. 2, 1998

(30) Foreign Application Priority Data

Dec. 5, 1996 (FI) .......................................... 964889

(51) Int. Cl.⁷ ............................. G10L 11/00; G06F 11/00
(52) U.S. Cl. ..................... 704/201; 704/201; 714/716; 370/249
(58) Field of Search .................... 704/200, 201; 370/249, 252; 455/423, 424; 714/716, 715

(56) References Cited

U.S. PATENT DOCUMENTS

| | | |
|---|---|---|
| 5,237,612 | 8/1993 | Raith . |
| 5,566,161 * | 10/1996 | Hartmann et al. ............. 370/252 |
| 5,640,401 * | 6/1997 | Yamada ........................ 714/716 |
| 6,072,825 * | 6/2000 | Betts et al. .................... 370/249 |

FOREIGN PATENT DOCUMENTS

| | | |
|---|---|---|
| 44 16 407 | 11/1995 | (DE) . |
| 0 332 345 | 9/1989 | (EP) . |
| 932964 | 2/1995 | (FI) . |
| 951807 | 4/1995 | (FI) . |
| 960590 | 2/1996 | (FI) . |
| 954470 | 5/1997 | (FI) . |
| WO 95/01072 | 1/1995 | (WO) . |
| WO 96/23297 | 8/1996 | (WO) . |
| WO 96/31993 | 10/1996 | (WO) . |

OTHER PUBLICATIONS

European digital cellular telecommunications system (Phase2); Full rate speech transcoding (GSM 06.10), European Telecommunications Standard Institute, Sep. 1994, pp. 1–70.

Mouly et al, "The GSM System for Mobile Communications" 1992, pp. 7–699.

* cited by examiner

Primary Examiner—David D. Knepper
(74) Attorney, Agent, or Firm—Pillsbury Madison & Sutro LLP

(57) ABSTRACT

In some call-switching systems, transmitted speech samples may be sent back (back-looping) to the sender from a telephone switching center if the switching center is unable to send the speech samples forward. When supplementary information is sent with the speech sample, back-looping may cause a problem if the sending device interprets the signal as originating from another device. To avoid this problem, transmitted samples are subjected to a check value calucation such as a checksum or a cyclic redundancy check. The check value is stored in memory and any received samples are subjected to a check value calculation and compared to the stored samples. If the comparison yields a match, then the device will know that the received samples originated from itself and can be properly handled.

11 Claims, 6 Drawing Sheets

PCM SPEECH SAMPLE NO.

| | 1 | 2 | 3 | 4 | 5 | 6 | 7 | 8 | 9 | 10 | 11 | | 153 | 154 | 155 | 156 | 157 | 158 | 159 | 160 |
|---|---|---|---|---|---|---|---|---|---|---|---|---|---|---|---|---|---|---|---|---|
| MSB | X | X | | | | | | | 1 | | | | D43 | D45 | D47 | C16 | C18 | C20 | X | X |
| | X | X | | | | | | | C1 | C2 | C4 | | D44 | D46 | D48 | C17 | C19 | C21 | X | X |
| | X | X | 0 | 0 | 0 | 0 | 0 | 0 | | C3 | C5 | | | | | | | | X | X |
| | X | X | 0 | 0 | 0 | 0 | 0 | 0 | | | | | | | | | | | X | X |
| | X | X | 0 | 0 | 0 | 0 | 0 | 0 | | | | | | | | | | | X | X |
| | X | X | 0 | 0 | 0 | 0 | 0 | 0 | | | | | | | | | | | X | X |
| | 0 | 0 | 0 | 0 | 0 | 0 | 0 | 0 | | | | | | | | | | | T1 | T3 |
| LSB | 0 | 0 | 0 | 0 | 0 | 0 | 0 | 0 | | | | | | | | | | | T2 | T4 |

Fig. 3

DETECTION OF SPEECH CHANNEL BACK-LOOPING

This application is the national phase of international application PCT/FI97/00759 filed Dec. 4, 1997 which designated the U.S.

The present invention relates to digital telecommunication systems, and particularly to the detection of speech channel back-looping therein.

In conventional digital telecommunication systems, speech is transferred in a digital pulse code modulated (PCM) transmission channel as standard (A-law encoded or mu-law encoded) PCM samples, typically at a rate of 64 kbit/s, i.e. 8,000 samples/second. This provides excellent speech quality.

In some cases it has been possible to combine with digital speech samples other supplementary information, such as signalling messages or speech coding parameters of speech coded to a low bit rate. This supplementary information transfer can be based on what is known as the bit stealing technique, in which one or more bits (usually the least significant LSB) of the speech sample is chosen for this purpose. Since the LSB of a speech sample contains very little speech information, there is no detectable deterioration of speech quality. Such supplementary information is usually transmitted between the transmission devices or speech processing devices of the network.

In call switching, the following situation may arise. The speech processing device is activated before a call is switched forward in the telephone switching centre. In this case the speech processing device transmits PCM speech samples towards the telephone switching centre. It is the property of some telephone switching centres that speech channels are looped directly back to the sender if the switching forward is not ready. This results in the speech samples returning to the speech processing device which sent them. Usually this speech channel back-looping does not cause problems since call switching is not ready up to the user and consequently the back-looped speech/silence is not heard by anyone.

In contrast, in cases where supplementary information is sent in a speech sample, speech channel back-looping may cause problems. When the speech processing unit gets back supplementary information (e.g. a signalling message) it has sent, it may assume that the received information originates from some other device, not itself. Particularly if the signalling message is of a fixed format, it is impossible to distinguish the sender solely from said message.

In the following some examples will be given of cases involving the above problem.

In digital mobile communication systems, for example, the most limited resource is the radio path between mobile stations and base stations. To reduce the bandwidth required by one radio connection on the radio path, speech transfer utilizes speech coding for achieving a lower, e.g. 16 or 8 kbit/s, transfer rate than the 64 kbit/s transfer typically employed in telephone networks. The mobile station and the fixed network side must naturally have a speech encoder and decoder for the purposes of speech coding. On the network side the speech coding functions may be located in a plurality of alternative places, such as in a base station or in association with a mobile exchange. The speech encoder and decoder are often far away from the base station in the system as what is known as a remote transcoder unit, whereby speech coding parameters are transferred between the base station and the transcoder unit in the network in specific frames.

In each mobile terminating or originating speech call a transcoder is connected to the speech connection on the network side. The transcoder interface towards the mobile exchange is 64 kbit/s. The transcoder decodes a speech signal vocoded to a transmission channel of an 8/16 kbit/s rate from a mobile station (uplink) to a 64 kbit/s rate and encodes a 64 kbit/s speech signal to the mobile station (downlink) and from the mobile exchange to an 8/16 bit/s rate. Hence speech quality is lower than in a normal telephone network. This arrangement is trouble-free as long as one party of the call is a mobile station and the other e.g. a subscriber in the public switched telephone network (PSTN).

In the case of a mobile to mobile call MMC, the operation of the mobile communications network causes there to be one transcoder on a connection between a calling mobile station and a mobile exchange, and similarly another transcoder between a called mobile subscriber and (the same or another) mobile exchange. These transcoders are then coupled together via the mobile exchange(s) as a result of normal call switching. In other words, two transcoder units are coupled in tandem for each MMC call and the call is subjected twice to speech encoding and decoding. This is called tandem coding. Tandem coding is a problem in mobile communication networks since it impairs speech quality owing to extra speech encoding and decoding. Up to now tandem coding has not caused very much trouble since relatively few calls have been MMC calls. However, the number of MMC calls will continue to increase with an increasing number of mobile stations.

The applicant's Finnish patent application FI951807 discloses a transcoder having what is known as tandem coding prevention. An MMC call is switched as usual with the connection having two transcoders in a tandem configuration. The speech to be transferred between a transcoder and a mobile station has been coded by the vocoding method which decreases transfer rate. Both transcoders perform normal transcoding operations on the speech such that the speech is decoded in one transcoder into normal digital pulse code modulated (PCM) speech samples which are transferred to the other transcoder and encoded therein by said vocoding method. Speech information received from the mobile station and complying with said vocoding method, i.e. speech parameters, which are not subjected to transcoding operations (encoding and decoding) in either tandem connected transcoder, is transferred at the same time in a subchannel formed by one or two least significant bits of the PCM speech samples. The receiving transcoder selects the speech information complying primarily with this vocoding method for transmission across the interface to the receiving mobile station. As a result, vocoding is principally performed only in mobile stations and the vocoded speech information, i.e. speech parameters, are transferred through the mobile communication network without tandem coding, resulting in improved speech quality. When the receiving transcoder does not find vocoded speech information in the least significant bits of the PCM speech samples, the speech information to be transmitted over the radio interface is encoded as usual from the PCM speech samples.

The applicant's Finnish patent application FI960590 discloses a transmission equipment for optimizing the use of transmission resources on a transmission connection between telecommunication network elements, such as exchanges or base station controllers. Both ends of the connection are provided with a transmission equipment which is connected to a number of PCM channels originating from the switching centre. Between the transmission equipments is a lower-capacity PCM link where the bits of the PCM samples of each channel form subchannels in which lower-rate vocoded speech or data can be transferred. If a PCM coded speech signal in which one or more least significant bits of the PCM samples form a lower-rate subchannel is also received from the switching centre, the contents of this subchannel are multiplexed to one subchannel of the PCM link. If only a PCM coded speech signal is received from the switching centre, it is encoded into a lower-rate vocoded speech signal and the vocoded speech signal is multiplexed into one subchannel of the PCM link. At the other end of the connection the transmission equipment decodes the vocoded speech signal back to PCM samples, into whose least significant bits are placed the contents of the subchannel without decoding. This transmission equipment is suitable for use particularly in association with the tandem coding described in patent application FI951807.

EP application 0,333,345 describes tandem speech coding in a fixed telephone network using digital switches or vocoding. The speech codecs convert a 64 kbit/s speech signal into a lower rate vocoded signal, and vice versa. Each speech codec is adapted by means of special signalling to detect whether another corresponding speech codec is connected in series on the transmission path, which is 64 bit/s. This signalling is carried out in a signalling channel implemented in the least significant bits of conventional PCM speech samples. It a speech codec detects the presence of another speech codec on the transmission path, it suspends the decoding of a vocoded speech signal into a 64 kbit/s signal. Instead it "embeds" the vocoded speech parameters into a 64 kbit/s signal in whose extra bits are placed "place holder" bits. The other speech codec receives this 64 kbit/s "compressed" signal, extracts the "place holder" bits therefrom and forwards only the vocoding bits.

In all above examples, speech channel back-looping can cause tandem coding prevention to be switched on in a device when the transmission of the device is looped back from the speech channel and is interpreted as a transmission from another device.

SUMMARY OF THE INVENTION

The object of the invention are means and a method enabling self-sent information included in a speech channel to be distinguished from similar information sent by other parties.

The invention is based on the idea that, particularly at the beginning of a call, two speech processing functions and speech signals are typically independent of one another and random. Hence samples of speech from various senders are also independent of one another and random, whereby they can be utilized in identifying the sender thereof and consequently the sender of any supplementary information contained therein.

For identification, a check value is calculated on the basis of the speech samples which are sent simultaneously with the supplementary information frame, by using a predetermined calculation method. The check value is stored at the transmitting end. When a supplementary information frame is received from the speech channel, the speech samples associated therewith are used to calculate a check value in the same way as at the transmitting end. If the check values match, it is concluded that the supplementary information frame is the same as the one that was sent, i.e. speech channel back-looping to the sender has occurred. If the check values do not match, the supplementary information frame is interpreted to have been sent by another party, and the process continues accordingly. The check value according to the invention enables a self-sent transmission to be very reliably distinguished from other transmissions, since owing to the random character of speech signals, the likelihood of an exact match between the check values of a sent and a received supplementary information frame is very slight when the frames originate from different sources.

The starting and/or ending points of check value calculation in a sent and received speech sample flow are determined relative to the supplementary information frame, e.g. its start or end.

The check value may be calculated across all the speech samples sent with an information frame, or alternatively only some speech samples may be used for calculating the check value. Part of the speech bits, all speech bits or both speech and supplementary information bits of each speech sample may be used. The calculation of the check value may be extended to speech samples preceding or succeeding the supplementary information frame. Generally speaking the accuracy of the check value is the better the more speech sample information is used for calculating the check value.

The invention provides a plurality of advantages. The amount of supplementary information to be sent does not increase as would be the case if some kind of information about the sender, such as a random number or a sender identity, were appended to the supplementary information frame. The invention does not require much memory since the principle is that only one check value is calculated and stored for each supplementary information frame. Memory need is much less than in e.g. solutions in which the data transmitted is stored in a memory, and the data received is compared with the data stored. This requires an amount of memory that is equal to the transfer delay in the loop.

BRIEF DESCRIPTION OF THE DRAWINGS

In the following the invention will be described in greater detail by means of preferred embodiments with reference to the attached drawings, in which FIG. 3 illustrates the positioning of a TRAU frame in 160 successive 8-bit PCM samples according to the invention.

DETAILED DESCRIPTION OF THE INVENTION

The present invention can be applied in a telecommunication system in which the intention is to transfer some supplementary information together with digital speech samples by e.g. the bit stealing technique. The supplementary information preferably comprises signalling messages or parameters of lower-rate vocoded speech.

An example is the European digital cellular telecommunication system GSM (Global System for Mobile Communication) which is becoming a world-wide standard for mobile communication systems. The basic structural parts of the GSM system are described in the GSM recommendations. As to a more precise description of the GSM system, reference in made to the GSM recommendations and the publication "The GSM System for Mobile Communications", M. Mouly & M- B. Pautet, Palaiseau, France, 1992, ISBN:2-95071900-7.

The GSM and its modification DCS1800 (Digital Communication System) operating in the 1800-MHz frequency range, are the primary scope of application of the invention, but the invention is not to be limited to these systems.

Figure 1:
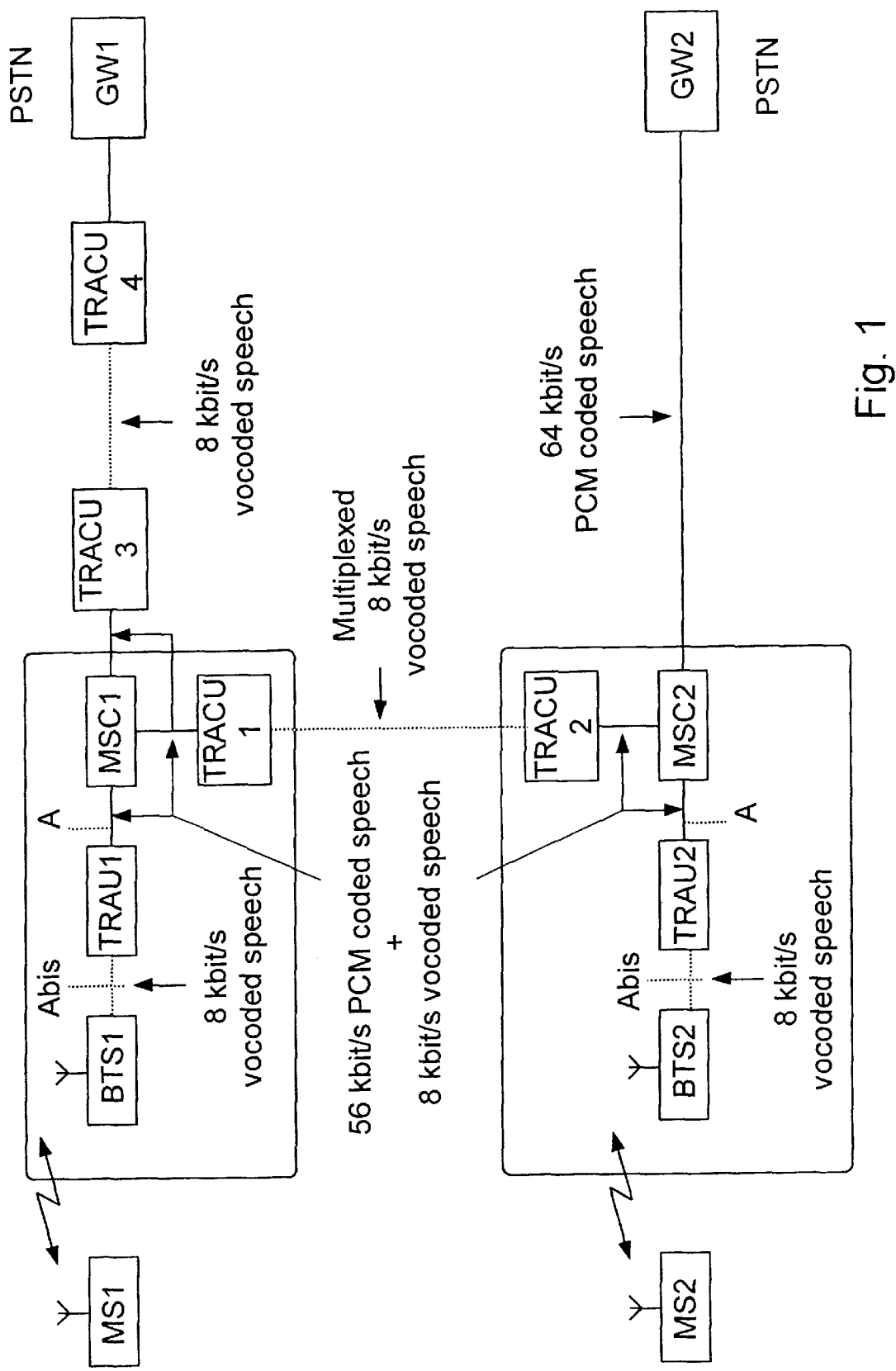
FIG. 1 shows a mobile communication system to which the invention can be applied.

FIG. 1 briefly describes some basic structural elements of the GSM system. A mobile exchange MSC switches incoming and outgoing calls. It performs tasks similar to those performed by an exchange in a fixed network. In addition is performs tasks typical of mobile telephone traffic only, such as e.g. subscriber location management. Mobile radio stations, i.e. mobile stations MS, are connected to the centre MSC via base station systems. A base station system consists of a base station controller BSC and base stations BTS. The base station controller BSC is used to control a plurality of base stations.

The GSM system is entirely digital with speech and data transfer also taking place in an entirely digital form. The speech coding method currently used in speech transfer is RPE-LTP (Regular Pulse Excitation-Long Term Prediction), which utilizes both long and short term prediction. The coding generates LAR, RPE and LTP parameters which are transferred instead of actual speech. Speech transfer is described in the GSM recommendations chapter 06, speech coding particularly in recommendation 06.10. In the near future other coding methods will also be employed, such as e.g. half-rate methods and reduced full-rate coding, in association with which the invention can be used as such. Since the actual invention is not directed to the actual speech coding method and is independent thereof, it will not be dealt with in greater detail herein. In the present application, the speech coding method is also called vocoding (voice coding), as a distinction between conventional PCM coding.

For speech coding a mobile station must of course comprise a speech coder and decoder. Since the implementation of a mobile station is not relevant to the invention and is not different from the conventional, it will not either be described in any greater detail herein.

On the network side various speech coding and rate adaptation functions are centralized into a transcoder unit TRAU (Transcoder/Rate Adaptor Unit). The TRAU can be located in a plurality of alternative places in the system according to the choices made by the manufacturer. The interfaces of the transcoder unit are a 64 kbit/s PCM (Pulse Code Modulation) interface (A interface) towards the mobile exchange MSC and a 16 or 8 kbit/s Abis interface towards the base station BTS.

When a transcoder unit TRAU is located remote from a base station BTS, information is transferred at the Abis interface between the base station BTS and the transcoder unit TRAU in what are known as TRAU frames comprising 320 bits when recommendation 08.60 is concerned or 160 bits when recommendation 08.61 is concerned. Four different types of frames are currently defined depending on the information contained therein. These include speech, operation/maintenance and data frames, and what is known as an idle speech frame. A transcoder unit located remote from a base station BTS has to receive information about the radio interface for efficient decoding. Special in-band signalling in an 8 or 16-kbit/s channel for transmitting speech or data between the base station and the transcoder unit is used for the control and synchronization of the transcoder unit. Such remote control of a transcoder unit has been defined in recommendation GSM 08.60 (16 kbit/s channel) and 08.61 (8 kbit/s channel).

Usually only PCM coded speech is transferred at the A interface between a transcoder TRAU and an MSC. In this case the transcoder TRAU is able to perform transcoding between vocoded speech and PCM coded speech.

The applicant's patent application FI951807 discloses an improved transcoder TRAU which, besides performing the usual transcoding operations between vocoded speech and PCM coded speech, also sends speech information received from a mobile station and complying with said vocoding method, i.e. speech parameters which are not subjected to a transcoding operation (decoding), in a subchannel formed by one (8 kbit/s capacity) or two (16 kbit/s capacity) least significant bits of PCM speech samples. Similarly, in the other transmission direction, the transcoder receives from a subchannel contained in the PCM samples of the A interface vocoded speech which is transferred to the Abis interface without transcoding operation (encoding). When switching an MMC call comprising two such transcoders in a tandem configuration, each transcoder in fact only forwards vocoded speech, possibly modifying or replacing parameters, but, however, without performing any extra vocoding. As a result, vocoding is mainly performed only in mobile stations MS, whereby tandem coding is avoided and speech quality improves. The implementation and operation of such an improved transcoder are described in greater detail in the above patent application.

Figure 2A:
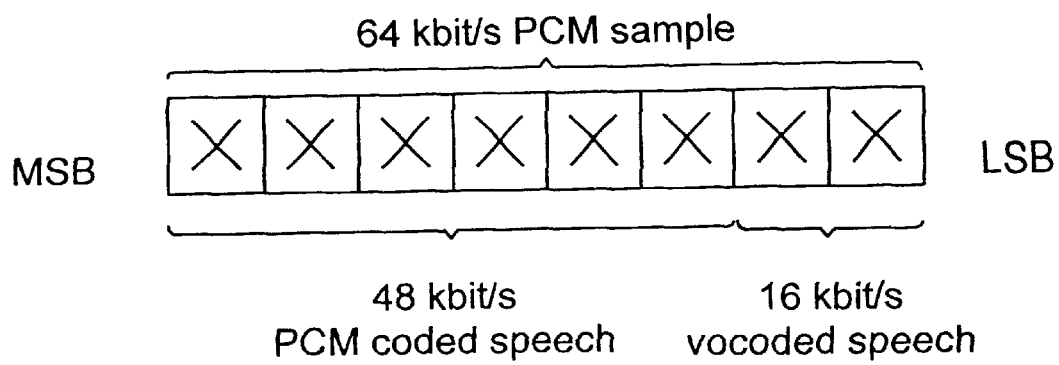
FIGS. 2A and 2B illustrate providing subchannels into the least significant bits of a PCM sample.
Figure 2B:
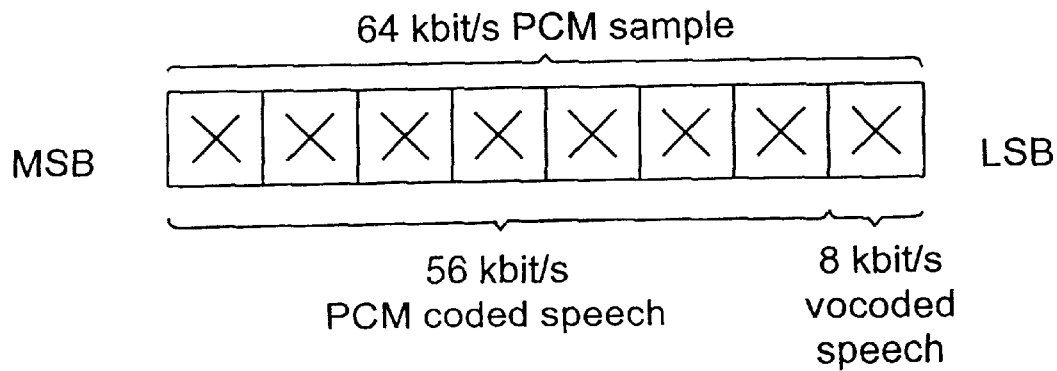

Thus two type of signals can appear at the A interface: 1) normal 64 kbit/s PCM, 2) PCM in which one or two least significant bits of PCM samples form a subchannel for vocoded speech (or data). The transfer of vocoded speech in the least significant bits of PCM samples is illustrated in FIGS. 2A and 2B. Furthermore, FIG. 3 illustrates a possible location of a TRAU frame in 160 successive 8-bit PCM samples. Two TRAU frame bits are placed in each PCM sample in the two least significant bit locations in accordance with FIG. 2A. PCM samples 1 to 8 contain synchronization zeros, PCM samples 9 to 18 control bits C1 to C15, PCM samples 19 to 155 data bits, and PCM samples 156 to 160 control bits C16 to C21 and T1 to T4. The six most significant bits of PCM samples are original PCM sample bits (marked with the symbol x). In the example of FIG. 2A, the transfer rate of PCM coded speech is 48 kbit/s and that of the subchannel 16 kbit/s. If the subchannel is implemented with one bit, such as in FIG. 2B, the transfer rate of PCM coded speech is 56 kbit/s and that of the subchannel 8 kbit/s.

The mobile exchange MSC switches calls at a nominal transfer rate of 64 kbit/s irrespective of whether the signal to be switched is of type 1) or 2).

In a conventional mobile communication network the links between switching centres also comprise one 64 kbit/s PCM channel for each A interface signal. Links between switching centres refer to links between mobile exchanges MSC and to links between a mobile exchange MSC and the gateway switching centres GW of the public switched telephone network PSTN.

In the example of FIG. 1 the capacity needed by the connection between the switching centres has been optimized by using the transmission or compression units TRACU1 . . . TRACU4 (Transcoding and Rate Adaptation Compressor Unit) disclosed in the above patent application FI960590. In other words, the switching centres are interconnected by two transmission equipments; each end of the connection comprising one equipment. Speech between the MSC (GW) and the TRACU is transferred as at the A interface, i.e. either as merely PCM coded speech (type 1) or as PCM coded speech containing a subchannel of vocoded speech (type 2). Between the TRACUs there is at least one 64 kbit/s PCM channel in which speech is always transferred as vocoded 8 kbits/s or 16 kbits/s speech in one or two bits of a PCM sample, respectively. The principle is the same as is illustrated in FIG. 2 for the A interface, but now all bits of a PCM sample are used as e.g. 8 or 16 kbit/s subchannels and PCM coded speech is not transferred at all. This way the TRACUs can multiplex 1 to 8 A interface PCM bit streams to one PCM bit stream for communication between the TRACUs. The compression equipment selects its mode of operation according to information received from the A interface, as was described above in association with the transcoder TRAU. This compression solution is described in greater detail in said patent application FI960590.

In these solutions the transcoders TRAU and compression equipments TRACU select their modes of operation according to the type of speech signal received from the A interface and/or the signalling contained therein. In this case back-looping of a self-sent signal in the switching centre may cause problems.

Let us assume for example in FIG. 1 that the establishment of an outgoing call from MS2 to PSTN has progressed to a stage at which the TRAU2 sends to the centre MSC2 PCM samples according to FIG. 3, the samples containing TRAU frames as supplementary information. However, the call is not ready between the MSC2 and the GW2, and hence the MSC2 has temporarily coupled the A interface lines originating from the TRAU2 back to the A interface lines terminating in the TRAU2. In this case the PCM samples sent by the TRAU2 are looped back to itself. If no mechanism for identifying the sender exists, the TRAU2 concludes that the received TRAU frames originate from another unit which also supports tandem prevention and selects the tandem prevention mode. However, the call is finally switched to the GW2 which does not at all support this feature.

In addition to or instead of vocoded speech, PCM samples may contain various signalling messages used by the devices to negotiate the properties of a communication, such as the vocoding method used (in a multiple codec environment) etc. In this case the back-looping of self-sent messages may cause an erroneous equipment configuration even before the call has been switched up to the other device. The invention is based on the fact that two speech processing functions and speech signals are typically, particularly at the beginning of a call, independent of one another and random. Hence speech samples received from different senders are also independent of one another and random, and can therefore be utilized in the identification of their sender and thereby the sender of the supplementary information contained therein.

In the invention a check value is calculated for identification of a sender on the basis of the speech samples which are sent simultaneously with the supplementary information frame. This check value is stored at the transmitting end. Upon reception of a supplementary information frame from a speech channel, a check value is calculated on the basis of the speech samples associated therewith in the same way as at the transmitting end. If the check values match, the conclusion is that the supplementary information frame is the same as the one transmitted, i.e. the speech channel is looped back to the sender.

Let us assume for example that the TRAU2 sends towards the MSC2 a PCM sample sequence including a TRAU frame according to FIG. 3. The TRAU2 then (in this example) calculates a predetermined check value across all speech sample bits X of the PCM speech samples 1 to 160 and stores the check value. Let us assume further that the TRAU2 receives from the direction of the MSC2 a PCM sample sequence including a TRAU frame according to FIG. 4. The TRAU2 then calculates, using the same principle as in transmission, a check value across the speech bits X of the received PCM speech samples 1 to 160 and compares the calculated check value with the stored check value. If the sent and received speech bits X are the same, the check values also match, and the TRAU2 is able to identify the received TRAU frame as a self-sent frame which the MSC2 has back-looped. This way the problems caused by speech channel back-looping can be avoided at the A interface of the transcoders and compression devices of FIG. 1.

The invention is, however, entirely independent of the nature of the transmitted supplementary information. In the following the invention will be described generally in a case in which the supplementary information is a signalling message.

Figure 4:
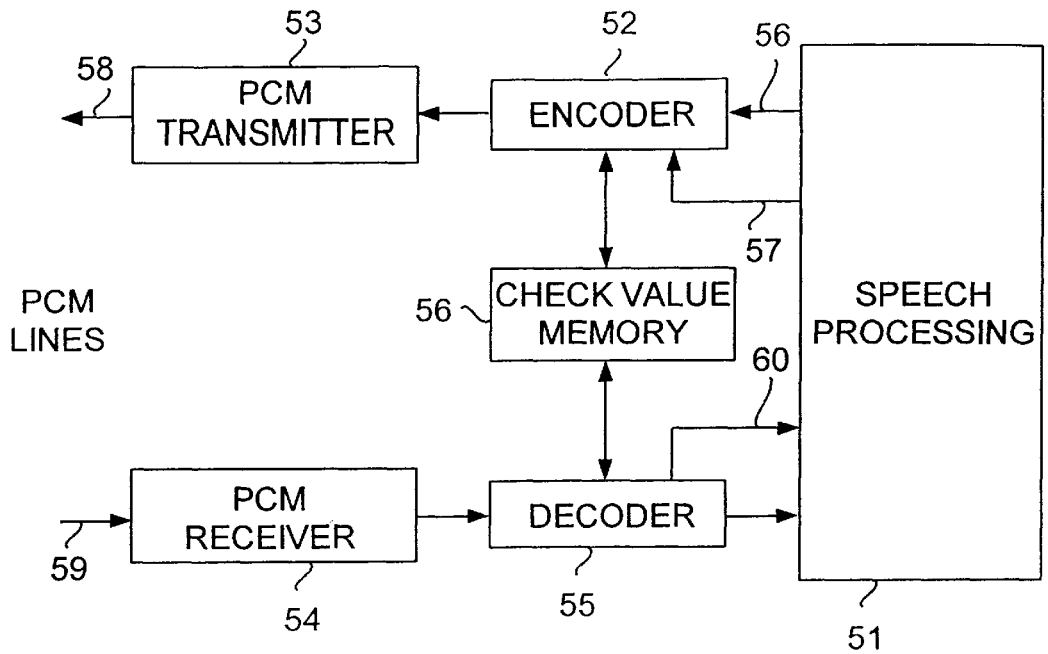
FIG. 4 is a block diagram of a speech processing equipment according to the invention.
Figure 6:
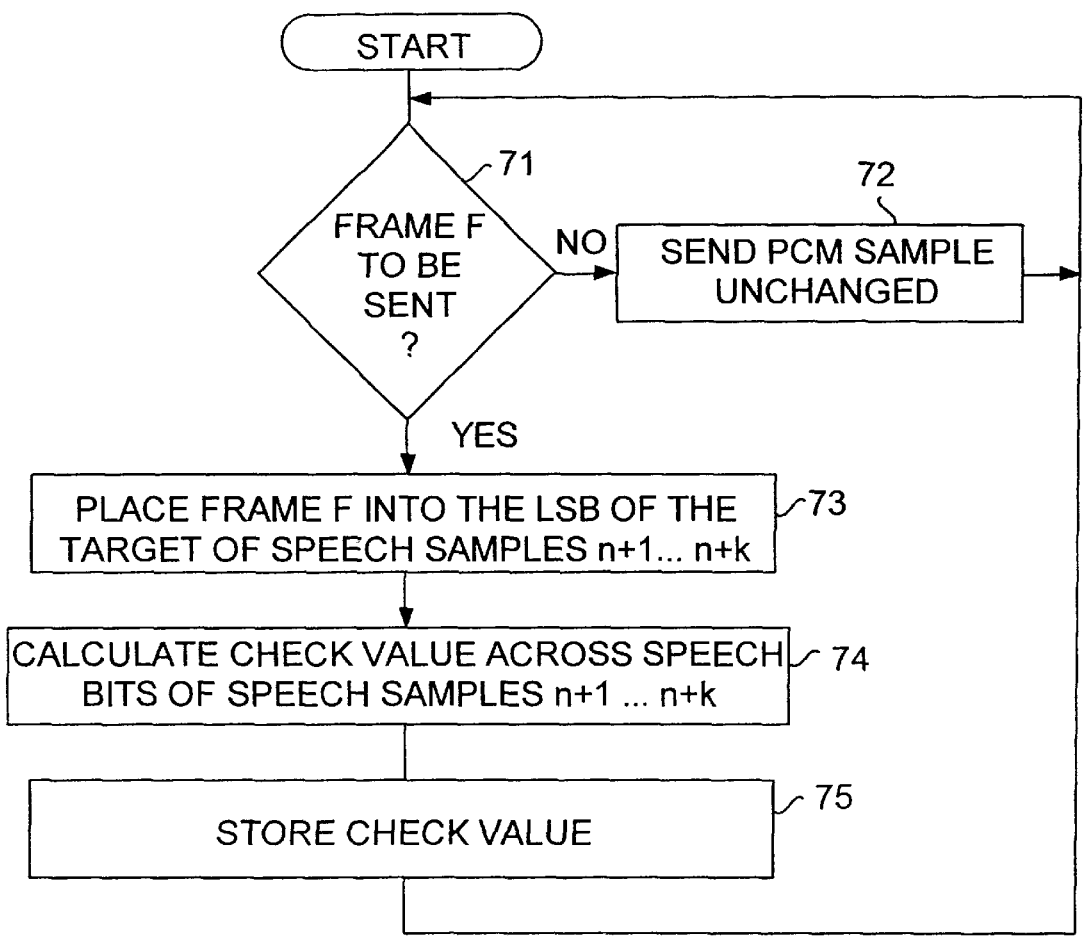
FIG. 6 is a flow diagram illustrating the operation of the message encoder of FIG. 4.
Figure 7:
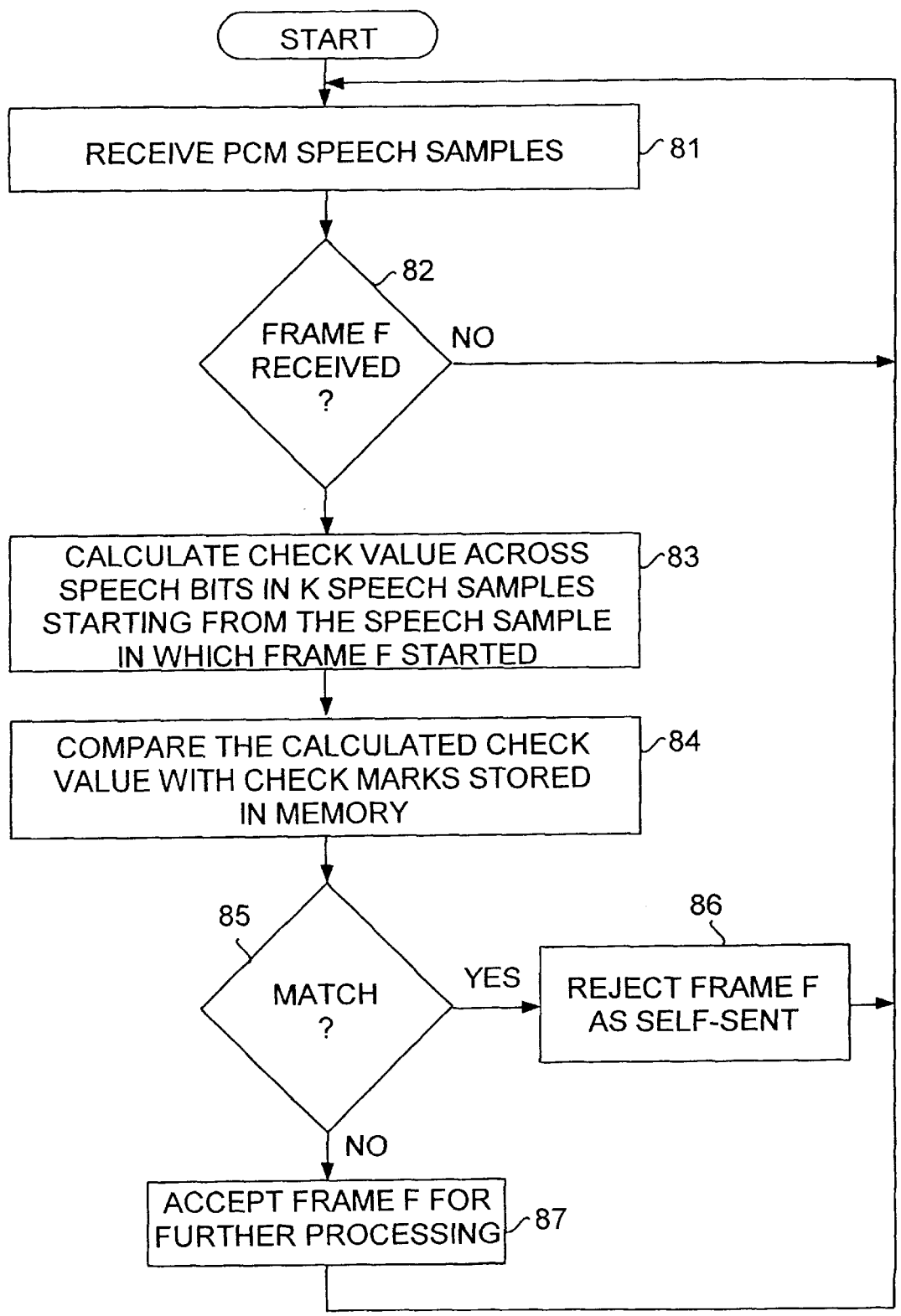
FIG. 7 is a flow diagram illustrating the operation of the message decoder of FIG. 4.

FIG. 4 shows a block diagram of a speech processing unit of the invention. A speech processing block 51 generally represents speech processing which generates PCM speech samples for transmission and processes received PCM speech samples. Such speech processing can include vo-encoding and vo-decoding, in the same way as was described above in association with the transcoder TRAU and the compression device TRACU. Speech processing may also have a mode in which vocoding parameters are sent in the LSBs of PCM samples. A PCM transmitter 53 and a PCM receiver 54 represent functions and devices for interfacing to PCM lines terminating at the switching centre and originating therefrom, respectively. A message encoder 52 and a message decoder 55 represent functions and devices for carrying out the signalling message transmission and reception and the sender identification according to the invention. FIG. 6 is a flow diagram illustrating the operation of the message encoder of FIG. 4. FIG. 7 is a flow diagram illustrating the operation of the message decoder.

Figure 5:
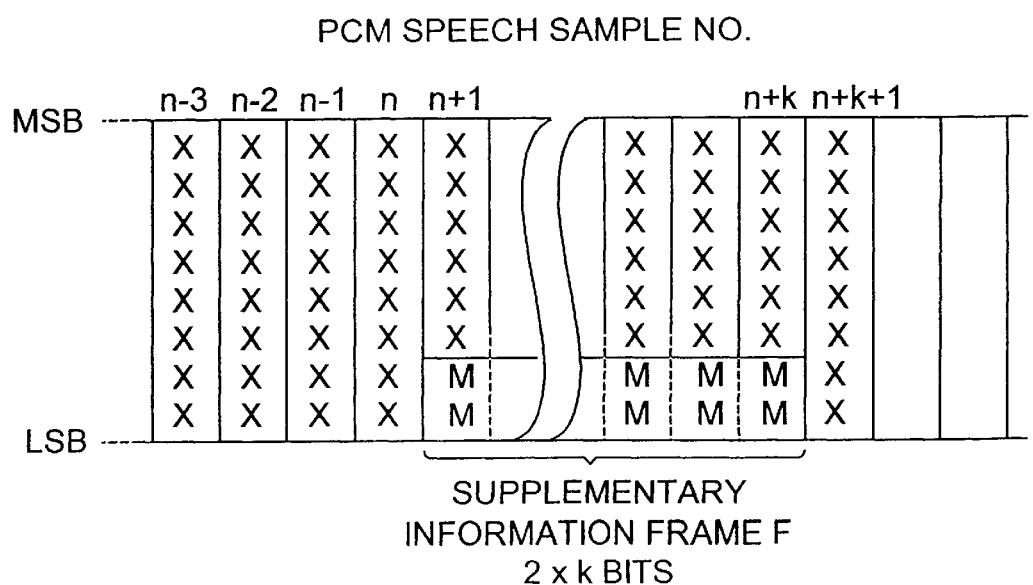
FIG. 5 is a PCM speech sample sequence containing a supplementary information frame F.

Let us first study a situation in which the speech processing unit sends a signalling message. FIG. 5 shows a PCM sample sequence in the output of the message encoder 52, with PCM samples (n−3) . . . (n+k+1) visible. The speech processing block 51 applies to the message encoder 52 PCM samples 56 containing only speech sample bits X. The message encoder 52 continuously checks (step 71, FIG. 6) if the speech processing block 51 has a signalling frame F to be sent on a line 57. If there is no signalling frame F to be sent, the message encoder 552 transmits the PCM samples 56 unchanged to the transmitter 53 (step 72) which sends them via an outgoing PCM line to the switching centre. This is what happens to the speech samples (n−3) . . . (n) in FIG. 5. At speech sample n+1 the message encoder detects that the line 57 has a signalling frame F comprising 2*k bits M to be sent. The message encoder 52 then places the bits M of the frame F into the two least significant bits (LSB) of the speech samples (n+1) . . . (n+k), step 73. In other words, at the output of the message encoder 52, the six most significant bits (MSB) in each speech sample (n+1) . . . (n+k) are speech sample bits X and the two LSBs are message bits M, as illustrated in FIG. 5. At the same time the message encoder 52 calculates across the speech bits X of the speech samples (n+1) . . . (n+k) the check value of the invention (step 74) and stores it in a check value memory 56 (step 75).

Transmission of the frame F ends at speech sample (n+k+1) which again is sent unchanged (steps 71 and 72), as illustrated in FIG. 5.

In the above example the check value was calculated across the speech bits X only. The check value could alternatively be calculated across the speech bits X and the message bits M. Furthermore, the check value can be alternatively calculated by using only some speech bits X, or some speech bits X and message bits M. It is also possible to use in addition or only the speech bits X of the sample(s) preceding or succeeding the frame F for calculating the check value. It is only essential to the invention that at least some speech information is used in calculating the check value to enable identification. The reliability of the identification improves the more speech information is used for calculating the check value.

The starting and ending point for calculating the check value is determined with respect to the frame F. In the above example, the calculation comprises k speech samples from the start of the frame. The calculation may alternatively be directed to e.g. the end of the frame F or to some identifiable field within the frame F.

The check value may be e.g. a cyclical code, such a cyclic redundancy code CRC, usually employed for error correction. All the bits of the code are determined by the bits used in the calculation, whereby bit strings with the same CRC are very likely to be identical. Thus the CRC can also be used reliably for identifying the sender, since the likelihood of two senders having exactly similar speech information is very small. Recommendation GSM 08.61 described a CRC calculation algorithm. The check value may also be e.g. some kind of check sum.

PCM samples received from a PCM line 59 originating from the switching centre are transferred from the receiver 54 to the message decoder 55 and further to the speech processing block. The message decoder 55 receives PCM samples (step 81, FIG. 7) and checks whether the received speech samples include a supplementary information frame F (step 82). If so, the message decoder 55 calculates the check value across the speech bits X in k speech samples starting from the speech sample (n+1) where the frame F started (step 83). The message decoder 55 then compares the calculated check value with check values stored by the message encoder 52 in the check value memory 56 (steps 84 and 85). If the check values match, the message decoder 55 concludes that the switching centre has looped back the frame F sent by the message encoder 53, and rejects the frame F (step 86). If the check values do not match, the message decoder 55 accepts the frame F (step 87) and transfers it via a line 60 to control speech processing.

The time the check values have to be stored in the memory 56 is equal to the time corresponding to the transfer delay from the transmitter 53 via the switching centre to the receiver 54.

If the frame F is a TRAU frame or other frame containing vocoded speech information, the message encoder 52 and the message decoder are preferably only units that add the vocoding information to the PCM samples and similarly remove the vocoding information from the PCM samples. In addition they calculate the check value of the invention and identify the sender.

In principle the invention can be applied to detecting speech channel back-looping even when the speech samples do not contain supplementary information. In this case check values are simply calculated from the sent and received speech samples and compared with each other. However, determining the starting and ending point for the calculation may cause problems.

The attached figures and the related description are only intended to illustrate the present invention. The details of the invention may vary within the scope and spirit of the attached claims.

What is claimed is:

1. A method of detecting speech channel back-looping in a speech processing unit, the method comprising the steps of
   sending digital speech samples to a speech channel,
   receiving digital speech samples from the speech channel, characterized by
   calculating by means of one or more speech samples to be sent a check value by using a predetermined calculation method,
   storing the calculated check value,
   calculating by means of one or more received speech samples a check value by using said predetermined calculation method,
   comparing the check value calculated from the received speech samples with the stored check value,
   concluding the presence of speech channel back-looping if the check values match.

2. A method as claimed in claim 1, characterized in that the method comprises the steps of
   sending to the speech channel PCM speech samples in at least some of which at least one bit is used for transferring supplementary information frames,
   calculating by means of one or more PCM speech samples to be sent a check value for the supplementary information frame to be sent therewith by using said predetermined calculation method,
   storing the check value calculated for the supplementary information frame,
   receiving from the speech channel PCM speech samples in at least some which at least one bit is used for transmitting supplementary information frames,
   calculating by means of one or more received PCM speech samples a check value for the supplementary information frame received therewith by using said predetermined calculation method,
   comparing the check value calculated for the received supplementary information frame with the stored check value,
   concluding that the supplementary information frame is a self-sent supplementary information frame back-looped in the speech channel if the check values match.

3. A method as claimed in claim 2, characterized in that the calculation of the check value is started at a predetermined point in the supplementary information frame.

4. A method as claimed in claim 2 or 3, characterized in that said supplementary information frames comprise signalling messages used for control signalling between transmission and/or speech processing devices in the speech channel, and that the method further comprises a step of rejecting a signalling message for avoiding erroneous operation if said check values match.

5. A method as claimed in claim 4, characterized in that said signalling messages are used to control speech processing units coupled to the speech connection so as to prevent multiple speech coding on the speech connection.

6. A method as claimed in claim 2, or 3, characterized by
   sending to the speech channel PCM speech samples in which said supplementary information frames contain speech parameters of a lower-rate speech coding method, receiving from the speech channel PCM speech samples in which said supplementary information frames contain speech parameters of a lower-rate speech coding method, concluding the presence of another speech processing equipment supporting tandem speech coding prevention on the speech connection if the check values calculated from the sent and received speech samples do not match, ignoring the supplementary information frames if the check values calculated from the sent and received speech samples match.

7. A method as claimed in claim 1, characterized in that the check value is a cyclic redundancy code or a check sum.

8. A speech processing device in a telecommunication system enabling the transfer of supplementary information frames with digital speech samples in place of one or a few bits of the digital speech samples on a speech channel, characterized in that the speech processing device comprises means (52) for calculating a check value by means of one or more digital speech samples to be sent to the speech channel for a supplementary information frame to be sent therewith by using a predetermined calculation method, means (56) for storing the calculated check value, means (55) for calculating by means of one or more digital speech samples received from the speech channel a check value for a supplementary information frame received therewith by using said predetermined calculation method, means (55) for comparing the check value calculated for the received supplementary information frame with the stored check value by concluding that the supplementary information frame is a self-sent frame back-looped in the speech channel if the check values match.

9. A device as claimed in claim 8, characterized in that said supplementary information frames comprise signalling messages used for control signalling between transmission and/or speech processing devices in the speech channel.

10. A device as claimed in claim 8 or 9, characterized in that said signalling messages are intended to control speech processing devices (TRAU, TRACU) coupled to the speech connection so as to prevent multiple speech coding on the speech connection.

11. A device as claimed in claim 8, or 9, characterized in that said supplementary information frames comprise speech parameters of a lower-rate speech coding method, and that said comparison means (55) conclude the presence of another speech processing device supporting tandem speech coding prevention on the speech connection if the check values calculated from the sent and received speech samples do not match, and ignore the supplementary information frames if the check values match.

* * * * *

UNITED STATES PATENT AND TRADEMARK OFFICE
CERTIFICATE OF CORRECTION

PATENT NO. : 6,230,120 B1
DATED : May 8, 2001
INVENTOR(S) : Suvanen

It is certified that error appears in the above-identified patent and that said Letters Patent is hereby corrected as shown below:

<u>Title page,</u>
Item [73] and [86], should read
-- [73]   Assignee:      Nokia Telecommunications Oy

[86]:  PCT No.:        PCT/FI97/00759
        § 371 Date:    April 21, 1999
        § 102(e) Date: April 21, 1999 --

Signed and Sealed this

Fifth Day of November, 2002

*Attest:*

JAMES E. ROGAN
*Attesting Officer*   *Director of the United States Patent and Trademark Office*